United States Patent
Hulmani et al.

(10) Patent No.: US 7,349,428 B2
(45) Date of Patent: Mar. 25, 2008

(54) DATA ALIGNMENT OF THE PACKETIZED ELEMENTARY STREAMS IN THE CODED DATA BUFFER FOR DUAL DECODE

(75) Inventors: Girish Hulmani, Gottigere (IN); Sandeep Bhatia, Adarsh Palm Meadows (IN)

(73) Assignee: Broadcom Corporation, Irvine, CA (US)

( * ) Notice: Subject to any disclaimer, the term of this patent is extended or adjusted under 35 U.S.C. 154(b) by 932 days.

(21) Appl. No.: 10/609,918

(22) Filed: Jun. 30, 2003

(65) Prior Publication Data

US 2004/0264502 A1    Dec. 30, 2004

(51) Int. Cl.
*H04J 3/16* (2006.01)
*H04N 11/02* (2006.01)

(52) U.S. Cl. ............... 370/466; 370/469; 386/33

(58) Field of Classification Search ............ 386/33, 386/40, 109–112, 124; 370/465–466, 469; 375/240–240.2; 348/441–459
See application file for complete search history.

(56) References Cited

U.S. PATENT DOCUMENTS

| 5,675,331 | A | * | 10/1997 | Watanabe et al. | ............. 341/67 |
| 5,767,912 | A | * | 6/1998 | Bunting et al. | ........ 375/240.01 |
| 6,823,131 | B2 | * | 11/2004 | Abelard et al. | ............... 386/68 |
| 2004/0004560 | A1 | * | 1/2004 | Okamoto et al. | ............. 341/50 |
| 2004/0012510 | A1 | * | 1/2004 | Chen | ........................... 341/50 |
| 2004/0076194 | A1 | * | 4/2004 | Okamoto et al. | ........... 370/537 |

FOREIGN PATENT DOCUMENTS

EP    001085465 A2 *    3/2001

* cited by examiner

*Primary Examiner*—Chi Pham
*Assistant Examiner*—Tri H. Phan
(74) *Attorney, Agent, or Firm*—McAndrews Held & Malloy, Ltd.

(57) ABSTRACT

Presented herein is a scheme for processing multilayered packets. In one embodiment, an application engine aligns a lower level packet header with data objects in the multilayered packet. Additionally, the memory stores the objects of the multilayered packet, such that the objects start at the beginning of a data word. Remainder portions of data words can store 0's. Additionally, an object table stores records comprising object identifiers associated with particular objects, and the address where the particular object is stored.

14 Claims, 8 Drawing Sheets

DATA ALIGNMENT OF THE PACKETIZED ELEMENTARY STREAMS IN THE CODED DATA BUFFER FOR DUAL DECODE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Transport packets are used to transmit data over a communication medium. For example, transport packets are used to transmit audio and video data compressed in accordance with the MPEG specification. A decoder receives the transport packets, decompresses the audio and video data, and recovers a video signal.

The decoder receives the transport packets in a presentation buffer. A data transport processor demultiplexes the stream of transport packets and provides the video packets to a transport processor. Conventionally, a transport processor processes the PES headers. Processing the PES headers consumes significant clock cycles resulting in a reduced bit rate. The foregoing is aggravated when packets from different channels containing PES arrive at the same time.

Further limitations and disadvantages of convention and traditional approaches will become apparent to one of skill in the art, through comparison of such systems with embodiments of the present invention as set forth in the remainder of the present application with reference to the drawings.

BRIEF SUMMARY OF THE INVENTION

Presented herein is a scheme for processing multilayered packets. In one embodiment, an application engine aligns a lower level packet header with data objects in the multilayered packet. Additionally, the memory stores the objects of the multilayered packet, such that the objects start at the beginning of a data word. Remainder portions of data words can store 0's. Additionally, an object table stores records comprising object identifiers associated with particular objects, and the address where the particular object is stored.

In another embodiment, a transport engine aligns packet elementary stream headers with pictures from an MPEG-2 transport stream. Additionally, a compressed data buffer stores slices and rows of video data such that all row start codes, and slice start codes are stored at the beginning of a new data word. Remainder portions of the data words can stores 0's. Additionally, a start code table stores records comprising start code identifiers associated with particular start codes, and the address where the particular start code is stored.

These and other advantages and novel features of the present invention, as well as illustrated embodiments thereof will be more fully understood from the following description and drawings.

DETAILED DESCRIPTION OF THE INVENTION

Figure 1:
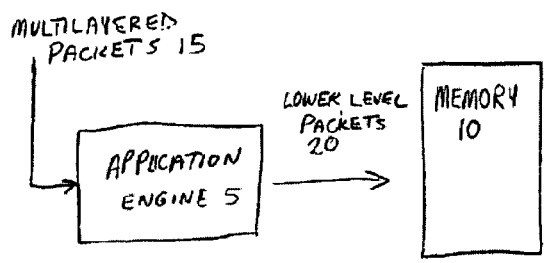
FIG. 1 is a block diagram of an exemplary decoder in accordance with an embodiment of the present invention.

Referring now to FIG. 1, there is illustrated a block diagram of an exemplary circuit for processing multilayered packets. The circuit includes an application engine 5 and a memory 10. The application engine 5 receives and operates on multilayered packets 15. The application engine 5 can comprise, for example, a processor executing a particular application, or a dedicated logic core for performing the application. After operating on the multilayered packets, 15, the application engine 5 outputs a modified stream of lower level packets 20 from the multilayered packets 15. The memory 10 stores the lower level packets 20.

Figure 2:
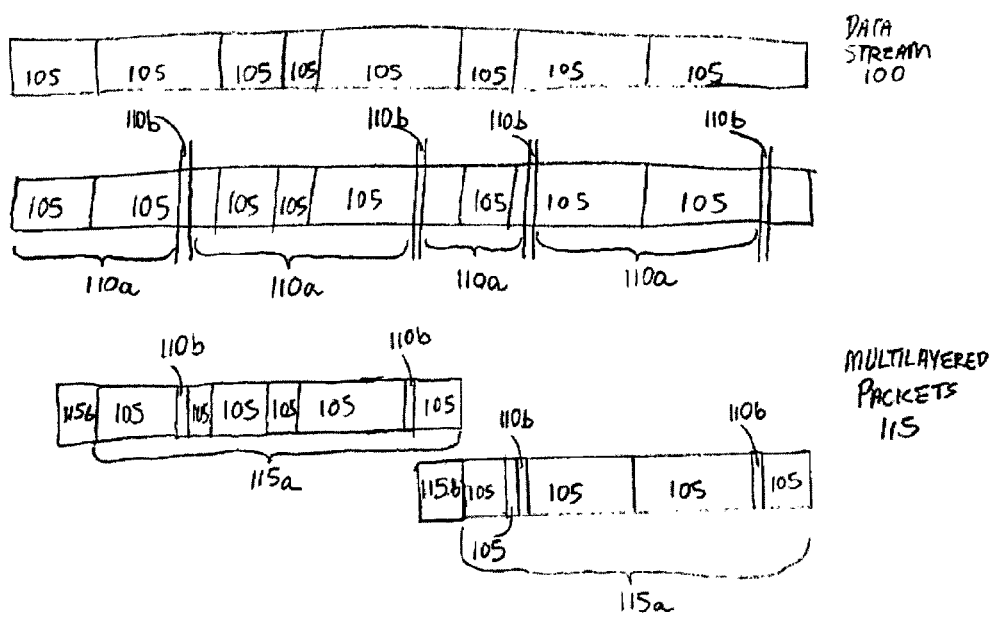
FIG. 2 is a block diagram of a multilayered packet processed in accordance with an embodiment of the present invention.

Referring now to FIG. 2, there is illustrated a block diagram describing modifications to a stream of data in accordance with an embodiment of the present invention. The data stream 100 includes a continuation of objects 105. The objects 105 themselves can form a hierarchy of other objects.

Data streams 100 are often broken into data packets 110 for processing. The data packets 110 include portions of the data 100 forming a payload 110a, and a packet header 110b. In many cases, the packet headers 110a are not necessarily aligned with the objects 105. In other words, the packet headers 110a can occur in the middle of an object 105.

Data streams 100 are also broken into packets for transmission. Packetization for transportation does not always correspond to the packetization for processing. In order to accomodate packetization for both processing and transmission, many applications and communications protocols use a multilayered packet approach. In a multilayered packet, the data stream 100 is packetized at one level forming a packetized stream, e.g., the data packets 110. The packetized stream 110 is then packetized with another layer of packetization, wherein portions of the packetized stream 110 form a payload portion 115a of a multilayered packet 115.

The multilayered packet 115 also includes a higher layer packet header 115b. The foregoing can be repeated for any number of successive layers.

Any number of multilayered packets 115 are transmitted successively, forming a multilayered packet stream 120. Many protocols and applications operate and otherwise handle different layers of the multilayered packet stream 120. The application engine 5 parses the packet headers 115b and operates on the payload 115a.

After the first application completes operation on the multilayered packets 115, the application removes the higher layer packet header 115b, and transmits the payload portion 115a of the multilayered packets 115, e.g., packetized stream 110. As noted above, the packetized stream 110 includes packet headers 110a which can occur in the middle of objects 105. The existence of packet headers 110a in the packetized stream occurring in the middle of the objects 105 complicates processing operations on the objects 105.

The application engine 5 aligns the packet headers 110a with the objects 105. In one embodiment, the application engine 5 can align a packet header 110a in the middle of an object 105 by moving the packet header 110a after the object 105 and before the next object 105. In another embodiment, the application engine 5 can align a packet header 110a in the middle of an object 105 by moving the packet header 110a immediately before the object 105.

The application engine 5 outputs the payload 115a of the multilayered packets, modified so that the data headers 110a are aligned with the objects 105, in a continuous stream, e.g., packetized stream 110. The memory 10 stores the packetized stream 110. With the data headers 110a aligned with the objects 105, another application can more easily operate on the objects 105.

In many cases, any number of objects 105 which are not data dependent on each other can be processed in parallel. In order to process the objects 105 in parallel multiple instances of an application access the different objects 105, substantially simultaneously. The applications access the objects 105 by accessing data from a particular location in the memory 10.

When the application engine 5 writes the packetized stream 110 to the memory 10, the application engine 5 creates a record in an object table indicating the starting address of the object 105. The applications which operate on the object access the memory address stored in the object table.

Figure 3:
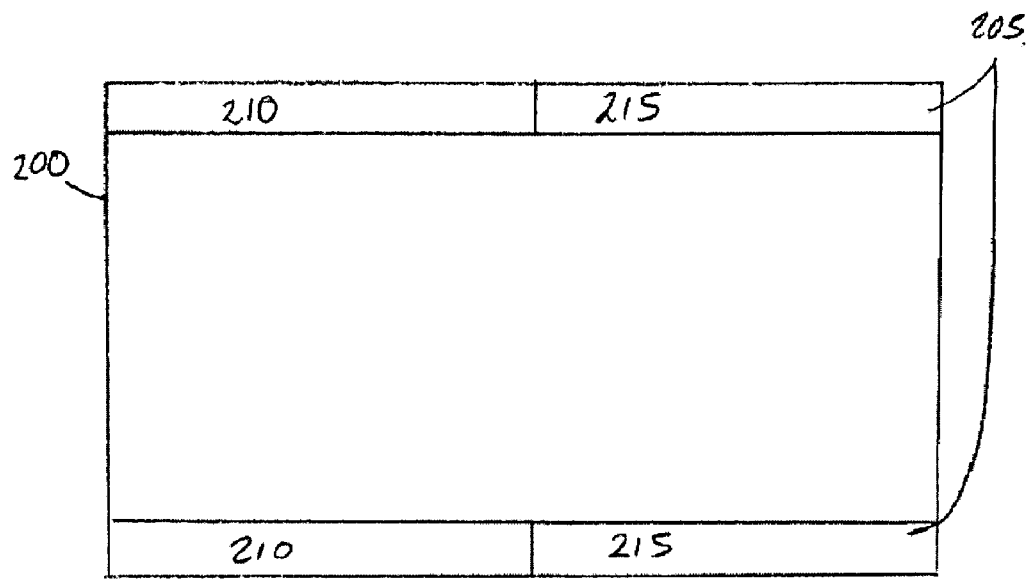
FIG. 3 is a block diagram of an object table in accordance with an embodiment of the present invention.

Referring now to FIG. 3, there is illustrated a block diagram of an exemplary object table 200. The object table 200 comprises any number of records 205. Each record 205 includes object identifiers 210 and an associated address identifier 215. The address identifier 215 can comprise, for example, a pointer.

When the application engine 5 writes the objects 105 into the memory 10, the application engine 5 adds a record 205 to the object table 200. The record 205 added to the object table 200 comprises an object identifier 210 identifying the object 105 written to memory 10 and an address identifier 215 identifying the starting address in memory 10 where the object 105 is written.

The memory 10 comprises data words 10a with a particular width. The objects 105 do not necessarily conform to the data word width of the memory 10. Additionally, in an object heirarchy, some of the lowest level objects can be less than the width of a single data word 10a. Accessing data starting from a point which does not coincide with a data word in memory 10 can be complex. To simplify accessing objects 105 stored in the memory 10, the application engine 5 writes the objects 105 at address locations which coincide with the start of a data word in memory 10.

Figure 4:
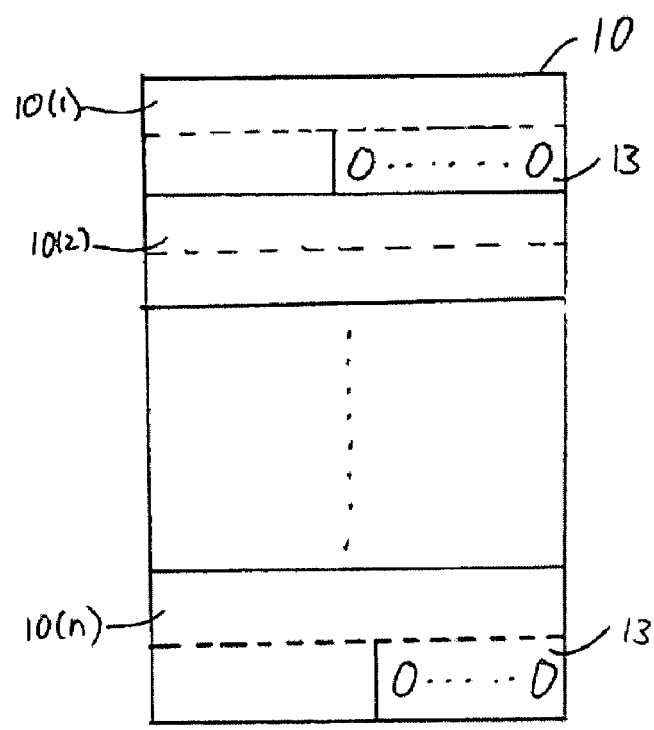
FIG. 4 is a block diagram of a memory module written to in accordance with an embodiment of the present invention.

Referring now to FIG. 4, there is illustrated a block diagram of the objects 105 written in memory 10 in accordance with an embodiment of the present invention. The memory 10 comprises any number of data words 10(1) . . . 10(n). The data words 10(1) . . . 10(n) have a particular width, which is usually $2^i$ bits, where i is an integer. For example, common data word 10(1) . . . 10(n) widths are 64 bits, and 128 bits.

The application engine 5 writes the objects 105 at the start of a data word 10(1) . . . 10(n). After the object 105 is written to the data word 10(1) . . . 10(n), any remaining unused portion 13 of the data word 10(1) . . . 10(n) is padded with 0's. Accordingly, the next sequential location after writing an object 105 to memory 10 is the start of another data word 10(1) . . . 10(n). The application engine 5 can either write every object 105 from the start of the data words 10(1) . . . 10(n) or, in the case of an object hierarchy, write every object 105 at a particular level from the start of the data words 10(1) . . . 10(n).

Figure 5:
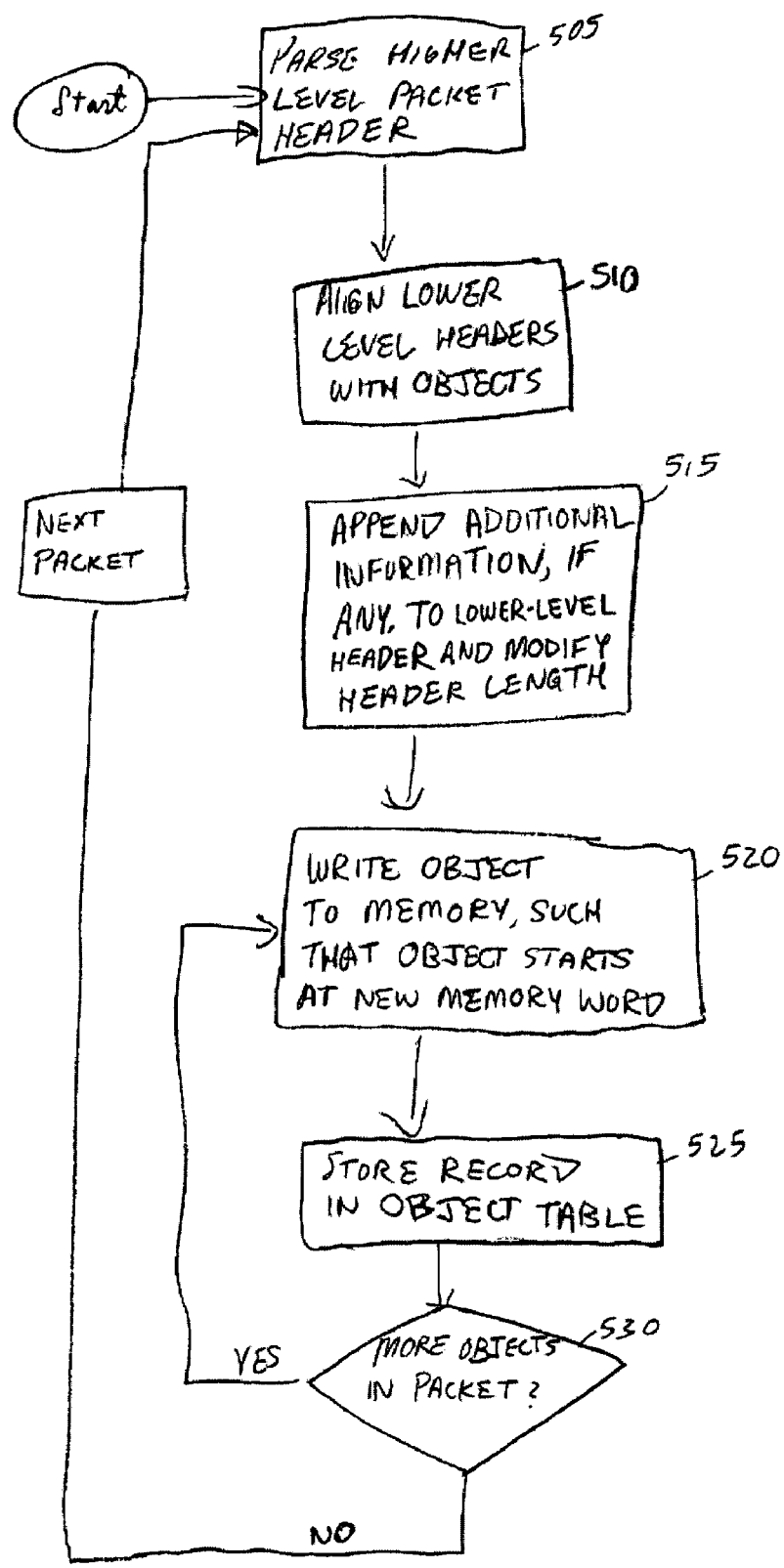
FIG. 5 is a flow diagram for processing a multilayered packet in accordance with an embodiment of the present invention.

Referring now to FIG. 5, there is illustrated a flow diagram for processing multilayered packets in accordance with an embodiment of the present invention. At 505, the application engine 10 parses a higher level packet header 115b from a multilayered packet 115. The application engine 10 examines the multilayered packet payload 115a for lower level headers 110a, and aligns the lower level headers 110a with objects 105 (510). At 515, the application engine 10 can append additional information to the lower level packet headers 110a. The additional information can include, for example, proprietary information that is understandable by another application. At 515, the application engine 5 can modify the lower level header length indicators in the lower level header 110a to indicate the length of the lower level packet header 110a with the appended additional information.

At 520-530, the application engine 5 writes the objects to the memory 10. At 520, the application engine writes the multilayered packet payloads 115a into memory 10, such that each of the objects 105 or each of the objects 105 which are above a certain level in an object heirarchy begin at the start of a particular data word 10(1) . . . 10(n). At 525, the application engine 5 pads with 0's, the remaining portion 15 of the data word 10(1) . . . 10(n) where the object 105 ends. At 530, application engine 5 stores a record 205 in the object table 200. The record 205 includes an identifier 210 identifying the object and an identifier 215 indicating the starting address of the object. The foregoing, 520-530, is repeated for all of the objects 105 in the multilayered packet payload 115a. After 520-530 are repeated for all the objects in the multilayered packet payload 115a, the next multilayered packet is selected during 535, and 505 is repeated.

As can be seen, the foregoing simplifies processing of multilayered packets 115. In one embodiment, the multilayered packets 115 can comprise transport packets. Transport packets can be used to transmit compressed digital video and/or audio data in accordance with the standard promulgated by the Motion Pictures Expert Group, known as MPEG-2.

Figure 6:
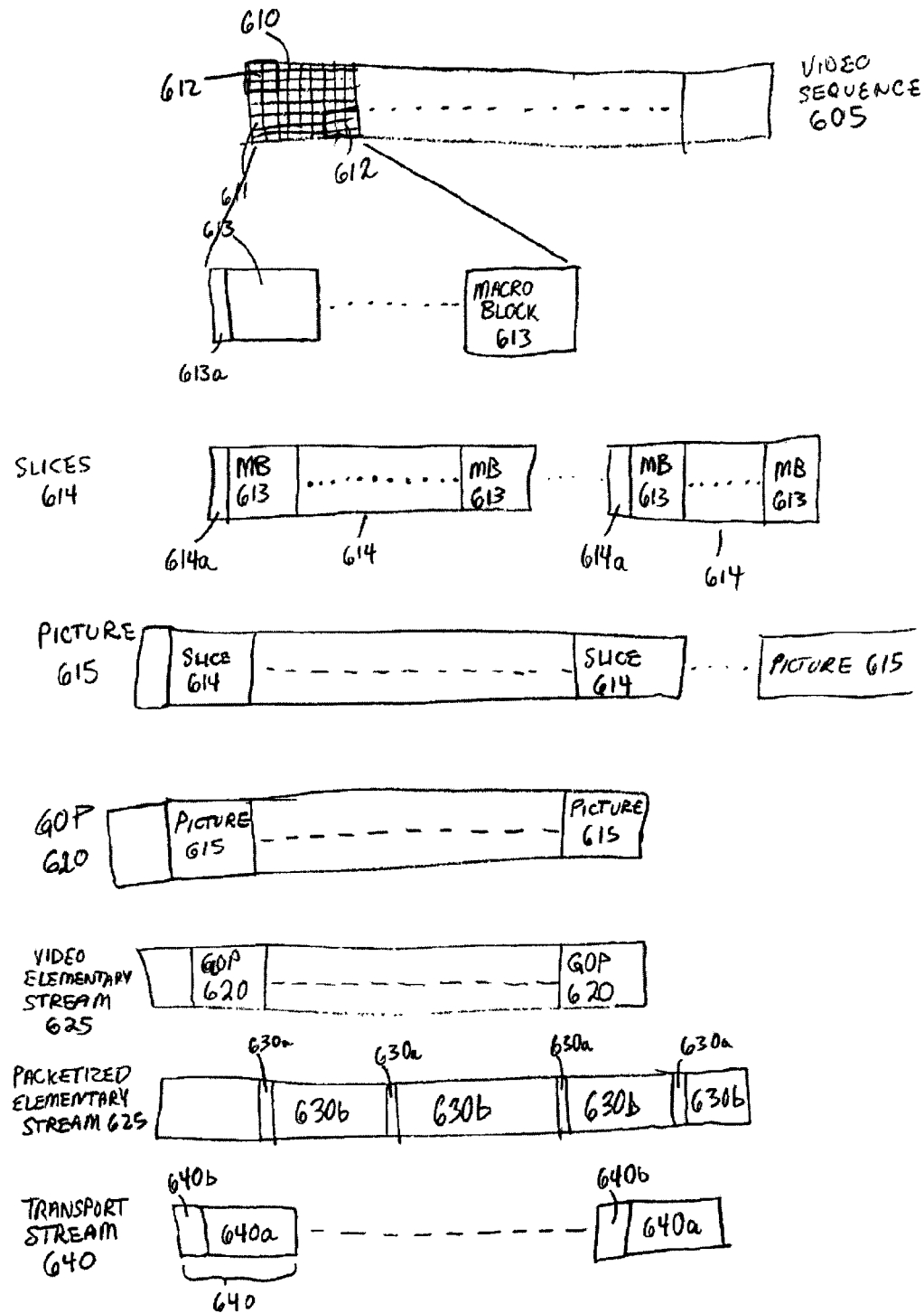
FIG. 6 is a block diagram of an exemplary transport stream.

Referring now to FIG. 6, there is illustrated a block diagram of a transport stream carrying a video sequence. A video sequence 605 comprises a series of frames 610. In a progressive scan, the frames 610 represent instantaneous images, while in an interlaced scan, the frames 610 comprise two fields each of which represent a portion of an image at adjacent times.

Each frame 610 comprises a two-dimensional grid of pixels 611. The two-dimensional grid of pixels 611 is divided into 8×8 segments 612. The MPEG standard takes advantage of spatial and temporal redundancy to compress the 8×8 segments. Each 8×8 segment is represented by a data structure known as a macroblock 613. The first macroblock in each row includes a row start code 613a.

The macroblocks 613 are grouped in what are known as slice groups. Each of the macroblocks 613 belonging to a slice group is stored in a data structure known as a slice 614. A slice 614 is commenced by a slice start code 614a. Each of the slices 614 associated with the frame are stored together in a data structure known as a picture 615. The picture 615 is a compressed representation of a frame and is also referred to as a video access unit (VAU). The pictures 615 are then grouped together as a group of pictures 620. Groups of pictures 620 are then stored, forming what is known as a video elementary stream 625.

The video elementary stream 625 is then broken into variable size segments that are packetized, forming packetized elementary stream (PES) packets 630. Each PES packet 630 includes a PES header 630a, and a payload 630b. The PES header 630a comprises several fields, among them, a PES start code, a stream identifier (stream_id), and a packet_length which indicates the length of the packet. The PES header 630a can also include timing information, such as a presentation time stamp (PTS) and a decode time stamp, as well as stuffing_bytes. The payload 630b comprises a particular segment of the video elementary stream 625. The PES packets 630 together form a PES 635. The PES headers 630a are not in any particular alignment with respect to the pictures 615. Accordingly, the PES headers 630a can exist in the middle of a picture 615.

The PES 635 is then broken into fixed length segments. In MPEG-2, the fixed length is usually 188 bytes. Each fixed length segment forms a payload 640a portion of a transport packet 640. The transport packet 640 also includes at least four header bytes 640b with various parameters. The transport packets 640 are transported as a stream (a transport stream) over a communication channel for decoding by a decoder.

The decoder receives the transport stream 640 and recovers a perceptually similar video sequence 605. The decoder can include a number of different application engines which process the various different data structures in the transport stream 640. For example, the decoder can include an application engine for processing the transport packet headers 640b while another application engine decodes the elementary stream 625. To facilitate the processing and decoding of the transport stream 640, it is beneficial to align the headers 630a with the pictures 615.

Figure 7:
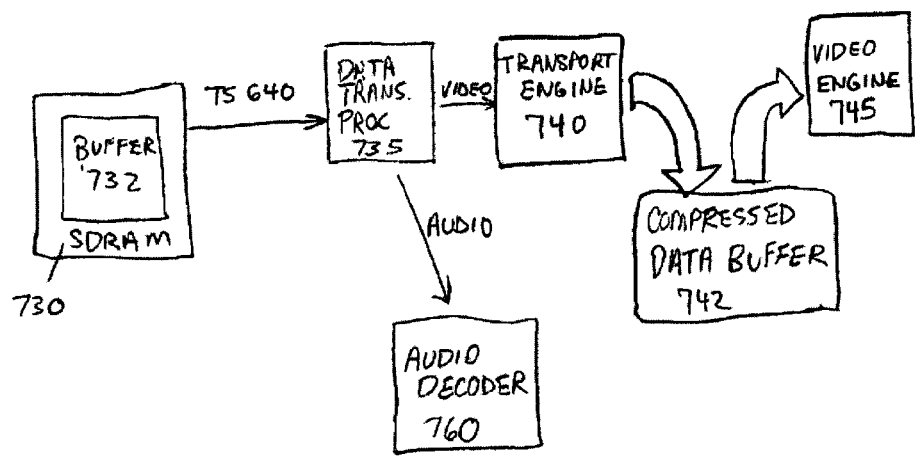
FIG. 7 is a block diagram of an exemplary decoder in accordance with an embodiment of the present invention.

Referring now to FIG. 7, there is illustrated a block diagram of an exemplary decoder in accordance with an embodiment of the present invention. Transport packets 640 are received and stored in a presentation buffer 732 within SDRAM 730. The presentation buffer 732 provides the stream of transport packets 640 to a data transport processor 735. The data transport processor 735 demultiplexes the stream of transport packets 640 into program constituents, and passes an audio portion of transport packets 640 to an audio decoder 760 and a video portion of transport packets 640 to a transport engine 740 and then to a video engine 745. The audio data is sent to the output blocks.

The transport engine 740 receives the stream of transport packets 640 and parses the transport header 640b and transfers the payload 640a into a compressed data buffer 742. As the payload 640b is transferred to the compressed data buffer 742, the transport engine 740 parses and stores the PES headers 630a in a temporary buffer. Later, the transport engine 740 inserts the stored PES headers 630a at the beginning of the next video access unit, or picture 615.

The PES header 630a is further explained using the following example. Consider the following portion of a PES extracted out of transport packets, wherein bytes are represented by bn:

... b1 b2 b3 00 00 01 03 ... bm 00 00 01 e0 PESbyte_1 PESbyte_2 PESbyte_3 PESbyte_4 PES_hdr_data_length ... lastPESheaderbyte bm+1 bm+2 00 00 01 04 bn bn+1 ... 00 00 01 00 ...

where 00 00 01 e0 is the start code of a PES header and 00 00 01 00 is the start code of a subsequent picture The transport engine moves PES header, 00 00 01 e0 ... lastPESheaderbyte, which is in the middle of a picture, 00 00 10 03 ... bm+2, immediately before the next picture, beginning with 00 00 01 00. The portion of the PES with the aligned PES header is:

... b1 b2 b3 00 00 01 03 ... bm bm+1 bm+2 00 00 01 04 bn bn+1 ... 00 00 01 e0 PESbyte_1 PESbyte_2 PESbyte_3 PESbyte_4 PES_hdr_data_length ... lastPESheaderbyte 00 00 01 00 ...

Additionally, the transport engine 740 can also append proprietary information to the PES packet header 630a. Where the proprietary information is appended to the PES packet header 630a, the transport engine 740 modifies the PES_header_length to include the length of the appended proprietary information. The proprietary data can travel as the stuffing_bytes field of the PES header 630s. If proprietary data is to be conveyed for a picture 615 that has no PES header 630a preceding it, the transport engine 740 can create a dummy PES packet header 630a which includes only the proprietary data.

According to MPEG-2 standard, the PES packet header 630a is limited to 256 bytes. In the event that the length of the PES packet header 630a is insufficient to store all of the additional propriery information, the transport engine 740 can store an additional dummy PES packet header 630a which includes only the proprietary data.

Additionally, the transport engine 740 alignes all row start codes 613a or slice start codes 614a, and the first non-slice start code encountered after a slice start code 614a to the width of data words in the compressed data buffer 742. The transport engine 740 creates a start code table that associates the row start codes 613a, the slice codes 614a, and the first non-slice start codes after slice start codes 614a, with the address in the compressed data buffer 742 that stores the row, slice 613a, or first non-slice start code.

The video engine 745 reads the aligned PES stream 635 data from the compressed data buffer 742 and parses the PES header 630a. While parsing the PES header 630a, the video engine 745 extracts the PTS and DTS and associates the PTS and DTS with the subsequence picture 615. If a PTS is not available, the transport engine 740 adds a delta PTS to the most recent PTS value. Additionally, the video engine 745 understands the proprietary information appended at the end of the PES header. The video engine 740 decodes the video data and provides the decoded video data for display.

Figures 8, 10:
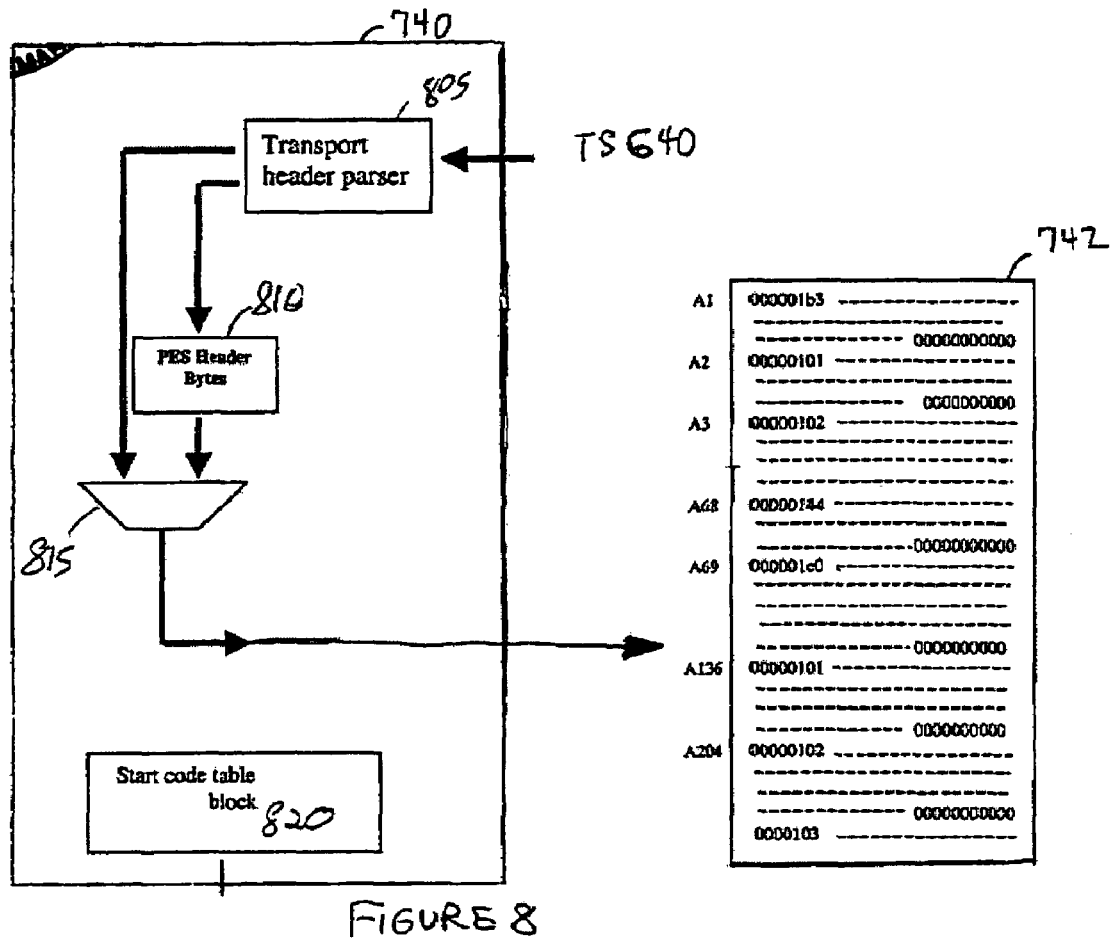
FIG. 8 is a block diagram of a transport processor in accordance with an embodiment of the present invention.
FIG. 10 is a block diagram of a start code table in accordance with an embodiment of the present invention.

Referring now to FIG. 8, there is illustrated a block diagram of an exemplary transport engine 740 in accordance with an embodiment of the present invention. The transport engine 740 comprises a transport header parser 805, a buffer 810 for temporarily storing PES headers 630a, start code detection logic 815, and a start code table block 820.

The transport header parser 805 receives the stream of transport packets 640 and parses the transport packet headers 640*a*. The transport header parser 805 also detects PES headers 630*a* and aligns the PES headers 630*a* with pictures 615 in the PES stream 635. Upon detecting a PES header 630*a*, the transport header parser 805 writes the PES header 630*a* to the buffer 810. Upon detecting the next picture 615, the PES transport header parser 805 retrieves the packet header 630*a* and stores the packet header 630*a* immediately before the picture 615. The foregoing results in a modified PES 635.

The start code detection logic 815 receives the PES stream 635 and detects row start codes 613*a*, slice start codes 614*a*, and the first non-slice start code encountered after a slice start code 614*a*. The non-slice start code can be, for example, a PES start code, a sequence header, a GOP, or a picture start code. The transport engine 740 sequentially parses the PES 635 into sequential data words of the compressed data buffer 742 until detection of a row start code 613*a*, slice start code 614*a*, or the first non-slice start code encountered after a slice start code 614*a*. Upon detection of a row start code 613*a*, slice start code 614*a*, or the first non-slice start code encountered after a slice start code 614*a*, the transport engine 740 pads the remainder of the data word written to immediately prior, and begins storing the PES 635 at the next data word.

As each row start code 613*a*, slice start code 614*a*, or the first non-slice start code encountered after a slice start code 614*a* is written to the compressed data buffer 742, the start code table formation block 820 stores a record comprising the start code, and the address of the data word storing the start code. Additionally, the record can also include information such as error status information.

Figure 9:
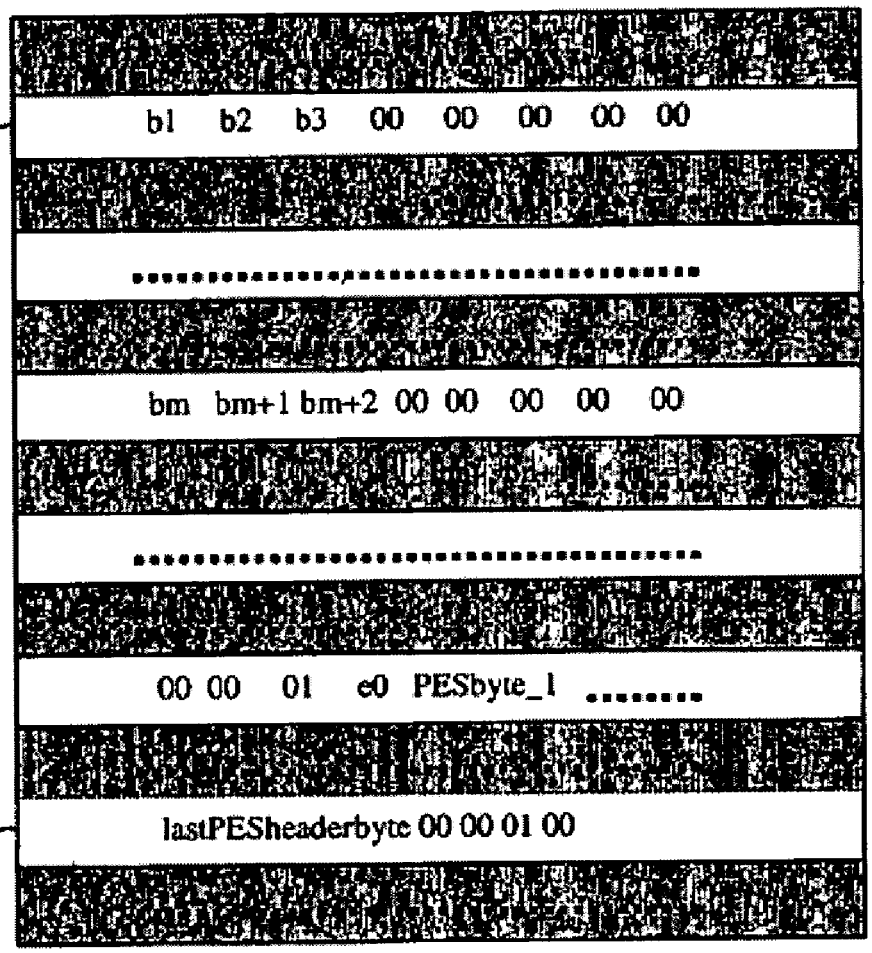
FIG. 9 is a block diagram of a compressed data buffer.

Referring now to FIG. 9, there is illustrated a block diagram of the compressed data buffer 742 storing an exemplary PES 635 in accordance with an embodiment of the present invention. Consider the following portion of a PES with PES header alignment:

. . . b1 b2 b3 00 00 01 03 . . . bm bm+1 bm+2 00 00 01 04 bn bn+1 . . . 00 00 01 e0 PESbyte_1 PESbyte_2 PESbyte_3 PESbyte_4 PES_hdr$_{13}$ data_length . . . lastPESheaderbyte 00 00 01 00 . . .

where: 00 00 01 03 represents a start code
and 00 00 01 04 represents a start code The compressed data buffer 742 comprises any number of data words 742(1) . . . 742(*n*). The data words 742(1) . . . 742(*n*) have a particular width, which is usually $2^i$ bits, where i is an integer. In the present example, data word width is 128 bits.

The transport engine 740 writes the start codes, e.g., "00 00 01 03" and "00 00 01 04" at the start of a data word 742(1) . . . 742(*n*), followed by the data after the start code, e.g., . . . bm bm+1 bm+2, and bn bn+1, . . . , respectively. The data following the start code is written to the data words 742(1) . . . 742(*n*) sequentially, until the next start code is detected. When the next start code is detected, any remaining unused portion of a data word 742(1) . . . 742(*n*) is padded with 0's. For example, after byte bm+2, start code "00 00 01 04" is encountered. The portion of the data word 742(1) . . . 742(*n*) after bm+2 stores 0's. The start code "00 00 01 04" is written at the start of the next data word 742(1) . . . 742(*n*)followed by the data after start code "00 00 01 04". When the start code "00 00 01 e0" is encountered, the start code is written to the next data word, and remainder of the previous data word stores all 0's.

Referring now to FIG. 10, there is illustrated a block diagram of an exemplary start code table 1000. The start code table 1000 comprises any number of records 1005. Each record 1005 includes start codes 1010 and an associated address identifier 1015. The address identifier 1015 can comprise, for example, a pointer.

When the transport engine 740 writes the start codes into the compressed data buffer 742, the start code table formation block 820 adds a record 1005 to the start code table 1000. The record 1005 added to the start code table 1000 comprises the start code and an address identifier 1015 identifying the starting address in compressed data buffer 742 where the start code is written.

Figure 11:
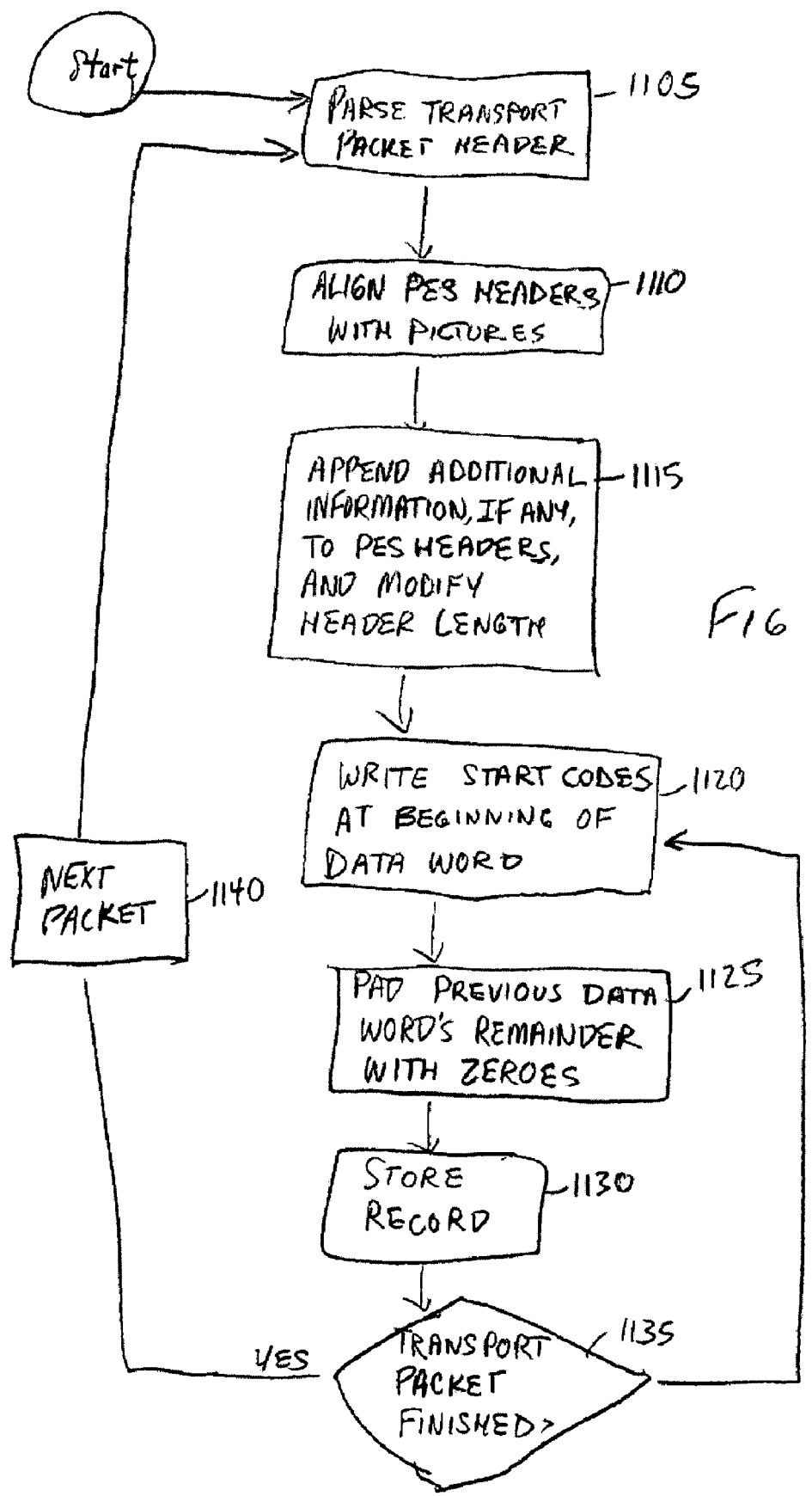
FIG. 11 is a flow diagram for processing a transport stream in accordance with an embodiment of the present invention.

Referring now to FIG. 11, there is illustrated a flow diagram for processing transport packets 640 in accordance with an embodiment of the present invention. At 1105, the transport engine 740 parses the transport packet header 640*b*. The transport engine 740 examines the transport packet payload 640*a* for PES headers 630*a*, and aligns the PES headers 630*a* with the pictures 615 (1110). At 1115, the transport engine 740 can append additional information to the PES packet headers 630*a*. The additional information can include, for example, proprietary information that is understandable by the video engine 745. At 1115, the transport engine 740 can modify header length indicators in the PES header 630*a* to indicate the length of the PES header 630*a* with the appended additional information.

At 1120-1130, the transport engine 740 writes the PES 635 to the compressed data buffer 742. At 1120, the transport engine 740 writes the PES 635 into the compressed data buffer 742, such that each of the row start codes, slice start codes, or first non-slice code after a slice code begin at the start of a particular data word 742(1) . . . 742(*n*). At 1125, the transport engine 740 pads with 0's, the remaining portion of the previous data word. At 1130, transport engine 740 stores a record in the start code table, including an identifier which identifies the start code and an identifier indicating the starting address of the start code. The foregoing, 1120-1130 are repeated for each row start code, slice start code, or first non-slice start code after a slice code in the transport packet 640, after which the next transport packet 640 is selected and 1110 repeated.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein the flow diagram of FIG. 5 is implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for processing a transport stream comprising a plurality of transport packets, said method comprising:
   parsing a transport header from the transport packets;
   moving packetized elementary stream headers from positions that are not aligned with pictures to positions that are aligned with pictures; and
   storing the packetized elementary stream headers and the pictures in a memory.

2. The method of claim 1, wherein storing the packetized elementary stream headers and the pictures further comprises:
   storing row start codes in alignment with data words in the memory.

3. The method of claim 2, further comprising:
   storing an indicator that indicates an address where the row start codes is stored in the memory.

4. The method of claim 1, further comprising:
   appending the packetized elementary stream header with additional data.

5. The method of claim 4, wherein the packetized elementary stream header comprises an indicator which indicates the length of the packetized elementary stream header, and further comprising:
   modifying the indicator to indicate the length of the packetized elementary stream header with the appended additional data.

6. The method of claim 1 further comprising:
   associating a presentation time stamp with the picture.

7. The method of claim 6, further comprising:
   adding an offset to presentation time stamp associated with the picture; and
   storing the offset presentation time stamp in the packetized elementary stream header.

8. A system for processing a transport stream comprising a plurality of transport packets, said system comprising:
   a transport processor for parsing a transport header from the transport packets and moving packetized elementary stream headers from positions that are not aligned with pictures to positions that are aligned with pictures; and
   a compressed data buffer for storing the packetized elementary stream headers and the pictures.

9. The system of claim 8, wherein the compressed data buffer stores row start codes in alignment with data words in the compressed data buffer.

10. The system of claim 9, further comprising:
    memory for storing an indicator that indicates an address where the row start codes are stored in the compressed data buffer.

11. The system of claim 8, wherein the compressed data buffer stores the packetized elementary stream header with appended data.

12. The system of claim 11, wherein the packetized elementary stream header comprises an indicator which indicates the length of the packetized elementary stream header, and wherein the transport processor modifies the indicator to indicate the length of the packetized elementary stream header with the appended additional data.

13. The system of claim 8 further comprising:
    a decoder processor for associating a presentation time stamp with the picture.

14. The system of claim 13, wherein the decoder processor adds an offset to the presentation time stamp associated with the picture and stores the offset presentation time stamp in the packetized elementary stream header.

* * * * *